(12) United States Patent
Gollapudi et al.

(10) Patent No.: US 7,610,351 B1
(45) Date of Patent: Oct. 27, 2009

(54) METHOD AND MECHANISM FOR PIPELINED PREFETCHING

(75) Inventors: Sreenivas Gollapudi, Cupertino, CA (US); Lakshminarayanan Chidambaran, Fremont, CA (US); Debashis Saha, Foster City, CA (US); Kapil Surlaker, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 705 days.

(21) Appl. No.: 10/144,083

(22) Filed: May 10, 2002

(51) Int. Cl.
*G06F 15/167* (2006.01)

(52) U.S. Cl. .................. 709/217; 707/10; 707/3; 707/2

(58) Field of Classification Search ............ 709/238, 709/217; 707/1–3, 10
See application file for complete search history.

(56) References Cited

U.S. PATENT DOCUMENTS

| | | |
|---|---|---|
| 4,803,613 A | 2/1989 | Kametani et al. |
| 4,868,764 A | 9/1989 | Richards |
| 4,905,138 A | 2/1990 | Bourne |
| 5,175,856 A | 12/1992 | Van Dyke et al. |
| 5,241,648 A | 8/1993 | Cheng et al. |
| 5,303,149 A | 4/1994 | Janigian |
| 5,305,389 A | 4/1994 | Palmer |
| 5,359,724 A | 10/1994 | Earle |
| 5,408,630 A | 4/1995 | Moss |
| 5,410,698 A | 4/1995 | Danneels et al. |
| 5,446,858 A | 8/1995 | Copeland et al. |
| 5,499,355 A | 3/1996 | Krishnamohan et al. |
| 5,586,260 A | 12/1996 | Hu |
| 5,600,316 A | 2/1997 | Moll |
| 5,604,490 A | 2/1997 | Blakley, III et al. |
| 5,632,015 A | 5/1997 | Zimowski et al. |
| 5,724,588 A * | 3/1998 | Hill et al. ............ 719/328 |
| 5,754,771 A | 5/1998 | Epperson et al. |
| 5,764,890 A | 6/1998 | Glasser et al. |
| 5,765,159 A | 6/1998 | Srinivasan |
| 5,787,461 A | 7/1998 | Stephens |
| 5,794,228 A | 8/1998 | French et al. |
| 5,797,001 A | 8/1998 | Augenbraun et al. |
| 5,799,302 A | 8/1998 | Johnson et al. |
| 5,802,528 A | 9/1998 | Oki et al. |
| 5,802,569 A | 9/1998 | Genduso et al. |
| 5,812,527 A | 9/1998 | Kline et al. |

(Continued)

OTHER PUBLICATIONS

IBM "SQL Reference" IBM DB2 Database Version 7: Online Information (aka DB2 Universal Database Version 7) (2003), 2 pgs., located at: http://auroa.vcu.edu/db2help/db2s0/funcdef.htm.

(Continued)

*Primary Examiner*—Saleh Najjar
*Assistant Examiner*—Thuong (Tina) T Nguyen
(74) *Attorney, Agent, or Firm*—Vista IP Law Group, LLP

(57) ABSTRACT

A method and mechanism for implementing pipelined prefetching in a computer system is disclosed. Data prefetching is utilized to predictably retrieve information between multiple levels of nodes in the computer system, in which a first server may receive prefetched data from a second server, the second server receives prefetched data from a third server, with the chain of prefetching extending as long as needed/desired to effect efficient data transfers between the nodes.

49 Claims, 8 Drawing Sheets

U.S. PATENT DOCUMENTS

| | | | | |
|---|---|---|---|---|
| 5,812,852 | A | 9/1998 | Poulsen et al. | |
| 5,813,000 | A | 9/1998 | Furlani | |
| 5,815,718 | A | 9/1998 | Tock | |
| 5,819,268 | A | 10/1998 | Hackett | |
| 5,822,749 | A * | 10/1998 | Agarwal | 707/2 |
| 5,822,790 | A | 10/1998 | Mehrotra | |
| 5,826,253 | A | 10/1998 | Bredenberg | |
| 5,826,270 | A | 10/1998 | Rutkowski et al. | |
| 5,832,231 | A | 11/1998 | Raman et al. | |
| 5,835,755 | A | 11/1998 | Stellwagen, Jr. | |
| 5,835,904 | A * | 11/1998 | Vicik et al. | 707/1 |
| 5,875,296 | A | 2/1999 | Shi et al. | |
| 5,878,223 | A * | 3/1999 | Becker et al. | 709/223 |
| 5,878,409 | A | 3/1999 | Baru et al. | |
| 5,895,463 | A | 4/1999 | Dowling et al. | |
| 5,913,025 | A | 6/1999 | Higley et al. | |
| 5,913,208 | A | 6/1999 | Brown et al. | |
| 5,918,013 | A | 6/1999 | Mighdoll et al. | |
| 5,930,795 | A | 7/1999 | Chen et al. | |
| 5,937,415 | A | 8/1999 | Sheffield et al. | |
| 5,937,421 | A | 8/1999 | Petrov et al. | |
| 5,958,040 | A | 9/1999 | Jouppi | |
| 6,009,265 | A | 12/1999 | Huang et al. | |
| 6,021,407 | A | 2/2000 | Meck | |
| 6,023,684 | A | 2/2000 | Pearson | |
| 6,052,699 | A | 4/2000 | Huelsbergen et al. | |
| 6,052,785 | A | 4/2000 | Lin et al. | |
| 6,067,623 | A | 5/2000 | Blakley, III et al. | |
| 6,073,168 | A * | 6/2000 | Mighdoll et al. | 709/217 |
| 6,076,092 | A | 6/2000 | Goldberg et al. | |
| 6,085,193 | A * | 7/2000 | Malkin et al. | 707/10 |
| 6,098,064 | A * | 8/2000 | Pirolli et al. | 707/2 |
| 6,112,197 | A * | 8/2000 | Chatterjee et al. | 707/3 |
| 6,112,209 | A | 8/2000 | Gusack | |
| 6,115,040 | A | 9/2000 | Bladow et al. | |
| 6,122,634 | A | 9/2000 | Brodsky | |
| 6,134,594 | A | 10/2000 | Helland et al. | |
| 6,141,759 | A | 10/2000 | Braddy | |
| 6,151,602 | A | 11/2000 | Heilsberg et al. | |
| 6,178,461 | B1 | 1/2001 | Chan et al. | |
| 6,286,104 | B1 | 9/2001 | Buhle et al. | |
| 6,310,918 | B1 | 10/2001 | Saha et al. | |
| 6,341,288 | B1 | 1/2002 | Yach et al. | |
| 6,401,193 | B1 | 6/2002 | Afsar et al. | |
| 6,421,342 | B1 * | 7/2002 | Schwartz et al. | 370/392 |
| 6,421,715 | B1 | 7/2002 | Chatterjee et al. | |
| 6,430,618 | B1 | 8/2002 | Karger et al. | |
| 6,463,508 | B1 | 10/2002 | Wolf et al. | |
| 6,484,179 | B1 | 11/2002 | Roccaforte | |
| 6,505,187 | B1 | 1/2003 | Shatdal | |
| 6,507,834 | B1 | 1/2003 | Kabra et al. | |
| 6,513,108 | B1 | 1/2003 | Kerr et al. | |
| 6,557,079 | B1 | 4/2003 | Mason, Jr. et al. | |
| 6,598,037 | B1 | 7/2003 | Craig et al. | |
| 6,598,121 | B2 * | 7/2003 | Challenger et al. | 711/122 |
| 6,604,097 | B2 * | 8/2003 | Phoenix et al. | 707/2 |
| 6,618,729 | B1 | 9/2003 | Bhashyam et al. | |
| 6,629,123 | B1 | 9/2003 | Hunt | |
| 6,662,218 | B2 * | 12/2003 | Mighdoll et al. | 709/219 |
| 6,665,684 | B2 | 12/2003 | Zait et al. | |
| 6,675,195 | B1 | 1/2004 | Chatterjee et al. | |
| 6,701,520 | B1 | 3/2004 | Santosuosso et al. | |
| 6,763,382 | B1 | 7/2004 | Balakrishnan et al. | |
| 6,907,429 | B2 * | 6/2005 | Carneal et al. | 707/10 |
| 6,973,457 | B1 * | 12/2005 | Bastawala et al. | 707/10 |
| 6,990,477 | B2 * | 1/2006 | Cotner et al. | 707/1 |
| 6,993,594 | B2 * | 1/2006 | Schneider | 709/245 |
| 7,089,331 | B1 * | 8/2006 | Gollapudi et al. | 709/247 |
| 7,127,463 | B2 * | 10/2006 | Arnold et al. | 707/10 |
| 2001/0003823 | A1 | 6/2001 | Mighdoll et al. | |
| 2001/0013045 | A1 | 8/2001 | Loschky et al. | |
| 2001/0051956 | A1 | 12/2001 | Bird | |
| 2002/0099806 | A1 | 7/2002 | Balsamo et al. | |
| 2002/0103778 | A1 * | 8/2002 | Saxena | 707/1 |
| 2002/0143728 | A1 | 10/2002 | Cotner et al. | |
| 2002/0194174 | A1 | 12/2002 | Calkins et al. | |
| 2003/0009538 | A1 * | 1/2003 | Shah et al. | 709/219 |

OTHER PUBLICATIONS

Padmanabhan et al. "Using Predictive Prefetching to Improve World Wide Web Latency" *Proceedings of the ACM SIGCOMM '96 Conference* (1996) pp. 1-15.

Jaedicke, M. and B Mitschang "On Parallel Processing of Aggregate and Scalar Functions in Object Relational DBMS" ACM (1998) pp. 379-389.

Partnerworld for Developers "What is the new Table Function?" IBM PartherWorld for developers Frequently Asked Questions (Sep. 9, 2002), 1 pg., located at: http://www.develper.ibm.com/tech/faq/individual?oid=2:12255 (this FQA question and answer no longer avail. online or in FAQs database).

IBM "Create Function (External Table)" IBM DB2 Universal Database Version 7: Online Information (2003), 12 pgs. the older version is no longer available in IBM website; the latest version of DB2 Universal Database related to Create Function (External Table) is located at http://publib.boulder.ibm.com/infocenter/db2v7luw/index.jsp?topic=/com.ibm.db2v7.doc/db2s0/crfnoldb.htm.

The Postgresql Global Development Group 9.7 Table Functions PostgreSQL 7.3.7 Programmer's Guide, 2 pgs., located at Chapter Postgre 7.3.7 documentation no longer existed in Postgre website, but has been archived at http://doc.rz.ifi.lmu.de/server/pg/7.3/ (Chapter 7.3.8 documentation is the latest version) http://www.postgresql.org/docs/7.3/static/xfunc-tablefunctions.html. (no date).

The Postgresql Global Development Group "Select" PostgreSQL 7.3.7 Programmer's Guide, 17 pgs., located at: Chapter Postgre 7.3.7 documentation no longer existed in Postgre website, but has been archived at http://doc.rz.ifi.lmu.de/server/pg/7.3/ (Chapter 7.3.8 documentation is the latest version) http://www.postgresql.org/docs/7.3/static/sql-select.html (no date).

Mogul, J.C., "Sqeezing more bits out of HTTP caches," Network, IEEE, vol. 14, No. 3, pp. 6-14, May/Jun. 2000.

* cited by examiner

METHOD AND MECHANISM FOR PIPELINED PREFETCHING

BACKGROUND AND SUMMARY

The invention relates to computer systems, and more particularly to a method and mechanism for prefetching in a computer system.

Many computer systems utilize servers, such as "database servers", to store and maintain information. In a client-server computer system model (or a multi-tiered computer architecture), users that wish to access or modify information at the server are often located at a "client". To facilitate the explanation of the invention, the terms "database server" and "database client" may be used in this document in place of "server" and "client"; however, the invention is not limited in its applicability to database systems, and indeed, can be utilized in many other types of computer systems.

In client-server systems, users at a database client submit commands to the database server to store, modify, or retrieve data. In response to the user commands, data manipulation or query activities are performed at the database server, with data results returned back to the database client for access. In networked environments, the database server often performs data manipulation or query commands submitted by remotely located clients. The client may establish a direct connection to the database server over the network, or may establish a connection through one or more intervening system components, such as an application server or transaction processing monitor. In either case, the database server processes the user commands and generates appropriate data outputs to be returned to the client. For example, a common database function is to perform data queries using a database query language such as SQL. The database server receives each query and generates a query result that satisfies the criteria defined by a particular query. The query result is subsequently transferred to the database client from which the query originated.

Inefficiencies may occur during the processing and transmission of data between the database server and client. For example, the database server produces a result set composed of a quantity of data that can be sent to a database client. The user may initially place an explicit request to transmit a first portion of that result set from the database server to the client, causing a first set of overhead, such as "network roundtrip overhead", to be expended. At a later time, the user may request a second portion of the result set to be transmitted to the client, resulting in another set of overhead to be expended. This process may proceed until all of the result set is sent, resulting in multiple sets of roundtrip overhead to be expended between the database server and the client. The expense of sending the data in response to multiple requests also includes the wait time that is expended while the user waits for the request to be sent to the database server and for the subsequent data to be sent back to the client. In addition, if the transmitted data are broken into smaller pieces than the optimum data transfer sizes for the system, additional overhead is expended. Thus, the more pieces that the data set is broken into before transmissions from the server to the client, the greater the overhead that is likely to be expended.

Another type of inefficiency that may occur is the retransmission of data in the returned result set. If the data to be sent to the client contains redundancies, then excess overhead, such as increased transmission time and data storage at the client, is expended by the system to transmit and store that redundant data. When the amount of data redundancies is sufficiently large, the excess overhead can have a serious effect upon system performance. Such a circumstance may occur, for example, if the client is querying large database tables with sparse data for performing queries with joins involving wide tables.

As is evident from the foregoing, inefficiencies may occur as a result of data transmissions between a database server and a client. These same inefficiencies may arise from other types of client-server applications, such as for example, a web-based architecture for sending web pages from a web server to a client station having a web browser. Moreover, these inefficiencies may be exasperated by a query in which data that is accessed to respond to the query exists at a remote location. This may occur, for example, if the query is sent to be processed at a first server, but the first server needs to access one or more additional servers in order to adequately process the query.

The present invention is directed to a method and mechanism for implementing pipelined prefetching in a computer system. According to an embodiment of the invention, data prefetching is utilized to predictably retrieve information between multiple levels of nodes in the computer system, in which a first server may receive prefetched data from a second server, the second server receives prefetched data from a third server, with the chain of pipelined prefetching extending as long as needed/desired to effect efficient data transfers between the nodes. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is directed to a method and mechanism for increasing the efficiency of data transfers between a server and a client using pipelined prefetching. In the following description, for the purposes of explanation, one or more embodiments having specific combinations of elements and/or process actions are set forth in order to provide a thorough understanding of the present invention. It will be apparent, however, to one skilled in the art that the present invention may be practiced without these specific combinations or order of elements/process actions.

Prefetching refers to the action of transmitting information before it is immediately requested, based upon predictive selection of data anticipated to be requested by a client in the future. To illustrate the invention, consider a data result set at a server as shown in table 100 of FIG. 1. Table 100 includes four rows of data 108, 110, 112, and 114. Initially, the client may only request a portion of table 100 to be sent from the server. This may occur, for example, in systems configured to conserve network bandwidth by allowing the request and transmission of only enough information to be sent that can fit onto a client's display device, page, window, or screen at a particular instant in time. In these systems, additional portions of the requested data are retrieved only if specifically requested, e.g., based upon the user scrolling or paging forward through the displayed data.

The initial request for data results in a certain amount of overhead, including a given quantity of network roundtrips for the user request from the client to server, as well as the data transmission from server to client. At a later time, the user may request a second portion of the result set to be transmitted from the server to client, resulting in further overhead being expended. This process is inefficient if the overhead of separately requesting and sending the data in multiple portions is higher than if the data is requested and sent at one time.

Figure 1:
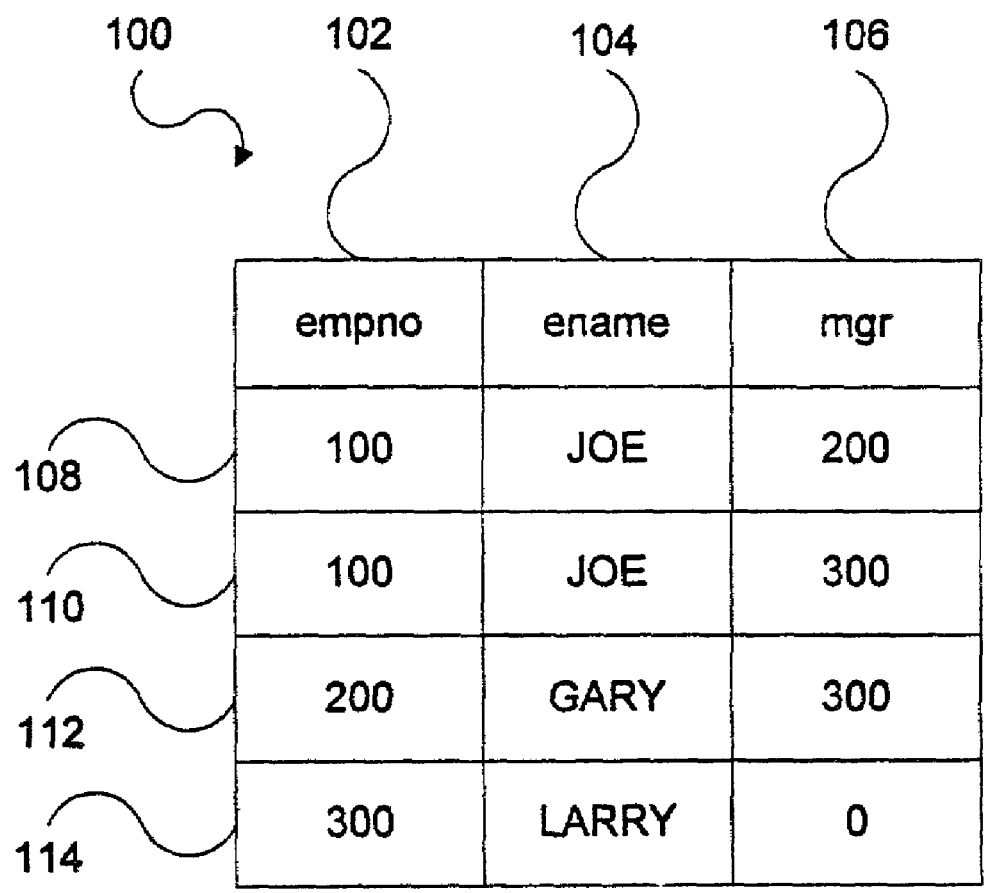
FIG. 1 depicts a sample database comprising data to be sent between server and client.

It can be predictively anticipated that the client will eventually require more data than is initially requested. In the case of FIG. 1, it can be anticipated that the entire data of table 100 will be requested by a client, whether or not only a first portion of table 100 can fit onto a display screen. Thus, additional portions of table 100, or even the entire table, are prefetched into a client-side cache, even if only a first portion is explicitly requested. When the rest of the table 100 is explicitly requested by the user, rather than sending another request to the server, the data can be efficiently retrieved from the client's local cache.

For an example in another context, consider an Internet web page having hyperlinks to other web pages/information. If a user requests the Internet web page to be sent to the client, it can be anticipated that the user may later wish to retrieve the additional web pages/information that are linked into the initial web page. With the present invention, the contents of the linked web pages/information can be prefetched into the client's local cache. If the user later requests that information, it can immediately be displayed to the user, without requiring any wait time or additional network overhead to request and retrieve that information. An example of a mechanism and process for prefetching data from a remote server that can be used in the present invention is disclosed in U.S. Pat. No. 6,675,195, which is hereby incorporated by reference in its entirety.

One approach to implement prefetching is to designate a "prefetch count" for a given connection or session from server to client. The prefetch count represents the number of additional rows of data to prefetch in response to an explicit fetch command. For example, if a prefetch count of one is established, then each request for a row from the server results in one additional row being returned, with the prefetched row being the row immediately following the explicitly requested row. If the prefetch count is set to 2, then each request for a row is increased by an additional 2 rows of data, etc. In an embodiment, the prefetch count is a tunable value that can be adjusted based upon current system and network conditions.

Figure 2:
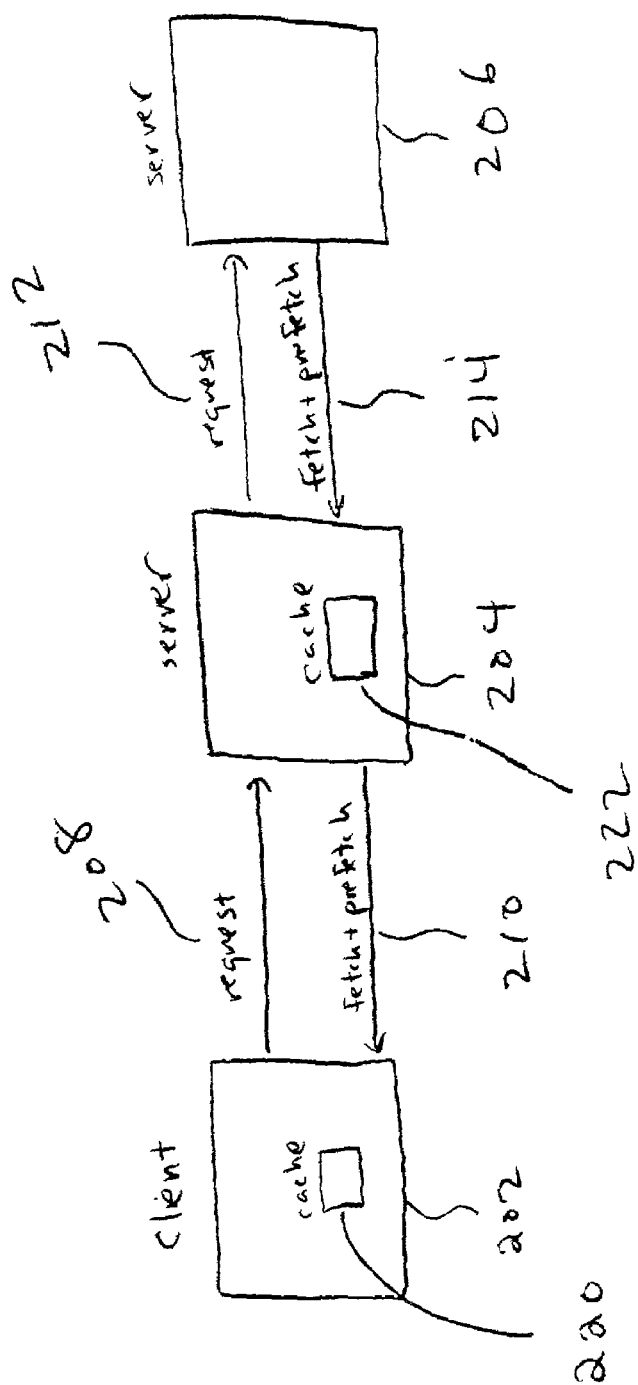
FIG. 2 shows an architecture for pipelined prefetching according to an embodiment of the invention.

FIG. 2 shows an embodiment of the invention, in which multiple levels of prefetching are utilized to retrieve data between network machines. Shown in FIG. 2 is a client device 202 that issues a query 208 to a first server 204. A client cache 220 may exist to locally cache rows in the result set that is returned to the client 202 from first server 204. In addition to returning immediately requested rows, the first server 204 may also return prefetched rows to client 202 that are also stored in cache 220.

To satisfy request 208 from client 202, first server 204 may need to send a data request 212 to a second server 206. Essentially, first server 204 becomes a client that is serviced by second server 206. The response from second server 206 may be stored in first server 204's local cache 222. In anticipation of future requests 212 from first server 204, second server 206 may return more rows to first server 204 than were explicitly requested. These additional rows are prefetched in anticipation of a future request for those rows, e.g., in response to an explicit or prefetch request by client 220. In this manner, an indefinitely long chain of server devices can be pipelined together with prefetch requests. This aspect of the present invention provides certain operating efficiencies, with the actual amount of benefit depending upon the system and network topology to which the invention is applied.

Figure 3:
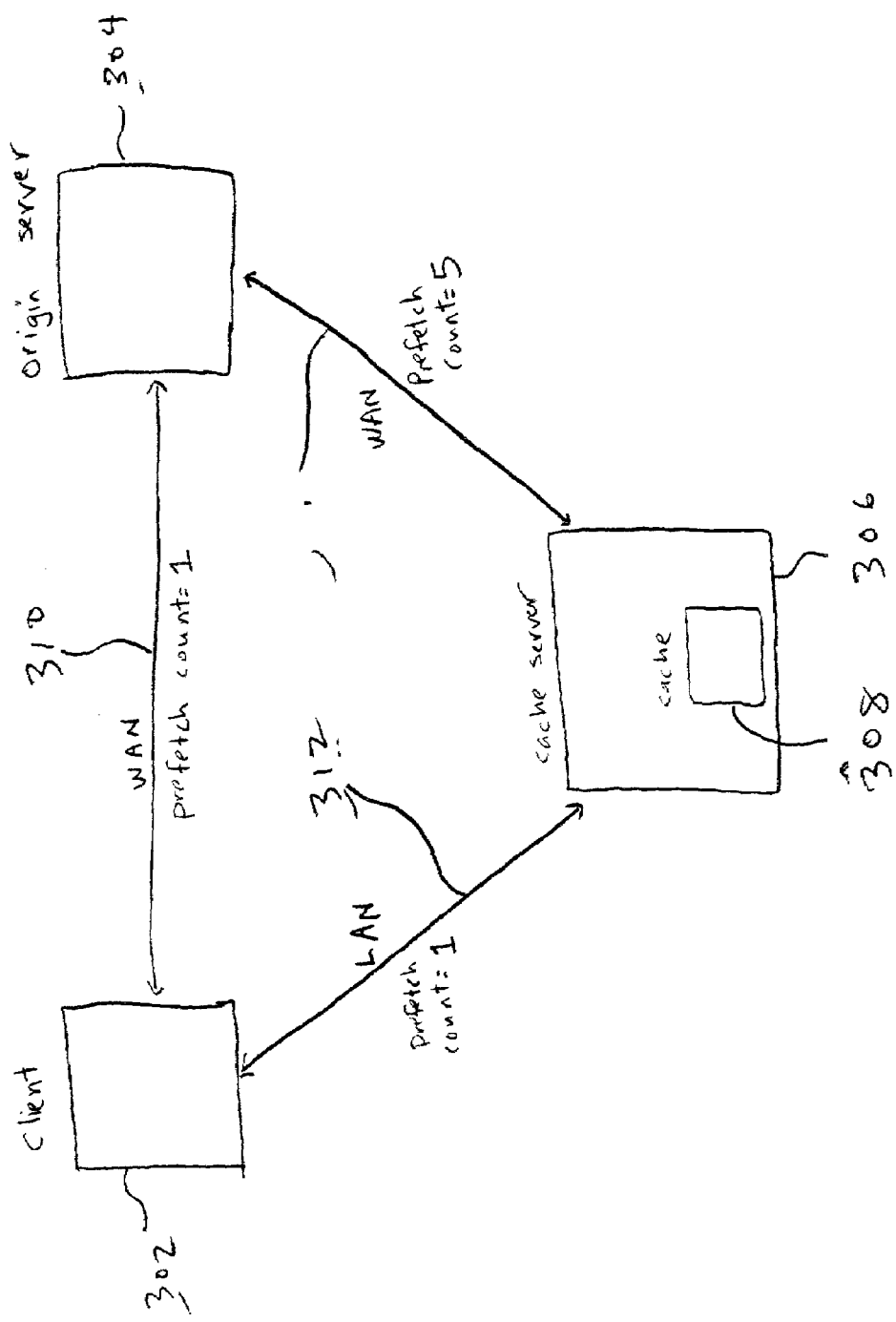
FIG. 3 illustrates pipelined prefetching according to an embodiment of the invention.

FIG. 3 illustrates an example of the type of efficiencies that may be gained by using this aspect of the invention. Consider if a client 302 issues a query that is to be executed by a remote server 304. The client 302 requests 6 rows from the result set generated by server 304. For purposes of this illustrated example, it is assumed that there exists two approaches for retrieving the result set to the client 302.

The first approach is a direct connection from client 302 over a wide area network (WAN) 310 to the remote server 304. In this example, each separate request for a row of data involves a single network roundtrip, and a prefetch count of one is established for this connection between client 302 and remote server 304. This means that every request to fetch one row of data (with each request costing one network roundtrip) will result in two rows of data actually being returned.

The following sequence may be performed to accomplish the retrieval under this first approach: (a) first, an initial request for a row of data is sent from client 302 to remote server 304; (b) the first and second rows of data are sent from remote server 304 to client 302 over WAN 310, with steps a and b costing one network roundtrip—this action can be immediately taken if the requested data exists in cache at server 304 (cache hit) or the data must be generated if not already existing in cache (cache miss); (c) a second request for a row of data is thereafter sent from client 302 to remote server 304; (d) in response, the third and fourth rows of data are sent from remote server 304 to client 302 over WAN 310, with steps c and d costing another network roundtrip; (e) a final request for a row of data is sent from client 302 to remote server 304; (f) in response, the fifth and sixth rows of data are sent from remote server 304 to client 302 over WAN 310, with steps e and f costing an additional network roundtrip, for a total cost of three network roundtrips required to retrieve the six rows of data.

In the second approach, the client sends its request to a local server 306 over a local area network (LAN) 312, and the local server 306 in turn sends a request for data to the remote server 304 over a WAN 314. In effect, the second approach incorporates the pipelined server approach described with respect to FIG. 2. As before, it is assumed that each separate request for a row of data involves a single network roundtrip. For this example, a prefetch count of one is established for the connection between client 302 and local server 304 over LAN 312 and a prefetch count of 5 is established for the connection between local server 306 and remote server 304 over WAN 314. Under this circumstance, every request from client 302 to fetch one row of data from local server 306 will result in two rows of data actually being returned. Every request from local server 306 to fetch one row of data from remote server 304 will result in six rows of data actually being returned.

The following sequence may be performed to accomplish the retrieval under the second approach: (a) first, an initial request for a row of data is sent from client 302 to local server 306; (b) if the data does not exist in the cache 308 at local server 306 (i.e., a cache miss occurs), then a request for a row of data is sent to remote server 304 over WAN 314; (c) in response, all six rows of data (1 requested row plus 5 prefetched rows) are sent from remote server 304 to local server 306, with steps b and c costing one network roundtrip over WAN 314; (d) the six rows of data are stored in cache 308; (e) the first and second rows of data are sent from local server 306 to client 302 over LAN 312, with steps a and e costing one network roundtrip over LAN 312; (f) a second request for a row of data is thereafter sent from client 302 to local server 306; (g) in response, the third and fourth rows of data are retrieved from cache 380 and sent from local server 306 to client 302 over LAN 312, with steps f and g costing another network roundtrip over LAN 312; (h) a final request for a row of data is sent from client 302 to local server 306; (i) in response, the fifth and sixth rows of data are retrieved from cache and sent from local server 306 to client 302 over LAN 312, with steps h and i costing an additional network roundtrip over LAN 312. The total cost of the second approach is therefore three network roundtrips over LAN 312 plus one network roundtrip over WAN 314.

In comparing the two approaches, it is noted that the cost of retrieving the six rows to client 302 under the first approach is 3 roundtrips over WAN 310. The cost of the second approach is 3 roundtrips over LAN 312 plus 1 roundtrip over WAN 314. Since a network roundtrip over a WAN is typically considered much more expensive than an equivalent roundtrip over a LAN, it is likely that the second approach is considered more efficient than the first approach. This surprising result is likely to be true, despite the fact that the second approach involves a cache miss while the first approach does not. This result can be adjusted by increasing the prefetch count on the connection between client 320 and remote server 304. However, such an increase would also result in a corresponding increase in memory usage at client 302, which may be an undesirable situation if a large quantity of rows is being requested by client 302.

It is also possible that some data previously sent and stored at the client will be the subject of a later request seeking re-transmission of the same data to the client. Such transmission of redundant data causes excess overhead to be expended both in terms of the transmission overhead (e.g., excess bandwidth usage) as well as the excess memory cache used at the client to store the redundant data. According to an embodiment of the present invention, data access and transmissions between a server and client are performed using a combination of "prefetching" and data redundancy management. Prefetching is employed to predictively retrieve information before it is explicitly requested by a client. Data redundancy management is employed to minimize the overhead of storing redundant information at the client. While the following description is made with respect to a client and server, it is noted that the following approach can also be implemented between two or more servers when pipelined prefetching is employed.

Figure 4A:
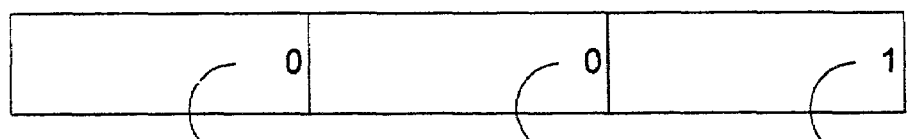
FIGS. 4A-4C illustrate bitmaps having change bits for the table depicted in FIG. 1.
Figure 4B:
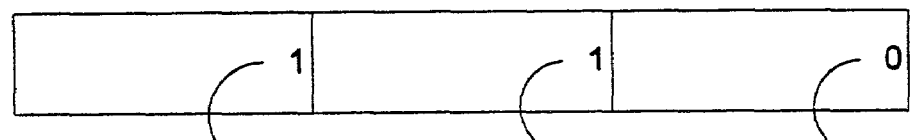
Figure 4C:
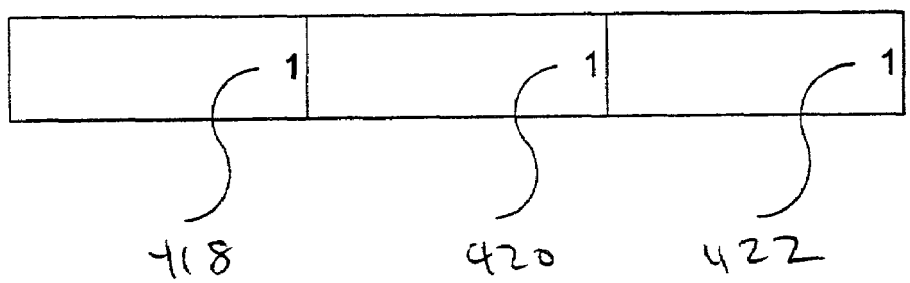

According to an embodiment of the invention, only data that is changed from one row to the next is transmitted from the server to the client or from a first server to a second server. Referring to FIGS. 4A, 4B, and 4C, shown are bitmaps that can be used in an embodiment of the invention to map changes from one row to the next. Each bitmap corresponds to a transition from a first row to a second row in table 100 in FIG. 1. Thus, bitmap 400 of FIG. 4A corresponds to the transition from row 108 to row 110 in table 100, bitmap 408 of FIG. 4B corresponds to the transition from row 110 to row 112, and bitmap 416 of FIG. 4C corresponds to the transition from row 112 to row 114.

In the bitmaps of FIGS. 4A, 4B, and 4C, each bit represents a transition from one column value of a first row to that same column value in the next row. A "0" bit represents no change of value from one row to the next, while a "1" bit represents a change of value. Referring to FIG. 4A, bitmap 400 corresponds to the transition from row 108 to 110 in table 100, as stated above. Bit 402 of bitmap 400 corresponds to the transition from row 108 to row 110 in column 102. Since there is no change of value from row 108 to row 100 in column 102 (i.e., the column value stayed the same), bit 402 is set at "0". Similarly, the column value of column 104 did not change from row 108 to row 110. As a result, the corresponding bit 404 in bitmap 400 is set at "0". However, bit 406 in bitmap 400 is set to "1", since its corresponding transition from row 108 to row 110 in column 106 has a change in value from "200" to "300".

In a similar manner, it can be seen that bits 410, 412, and 414 of bitmap 408 are set at "1", "1", and "0", respectively, corresponding to changes/no changes in value between rows 110 to 112 in table 100. Likewise, bits 418, 420, and 422 in bitmap 416 are set at "1", "1", and "1", respectively, corresponding to changes in value between rows 112 and 114 in table 100.

To reduce the transmission of redundant data in table 100 from server to client, table 100 is checked to determine whether redundant data between one row and the next is being requested. Bitmaps 400, 408, and 416 can be checked to make this determination. Only data that changes from one row to the next will be sent from server to client. As noted above, changed data corresponds to the value of "1" for each bit in the bitmaps 400, 408, and 416.

Figure 5:
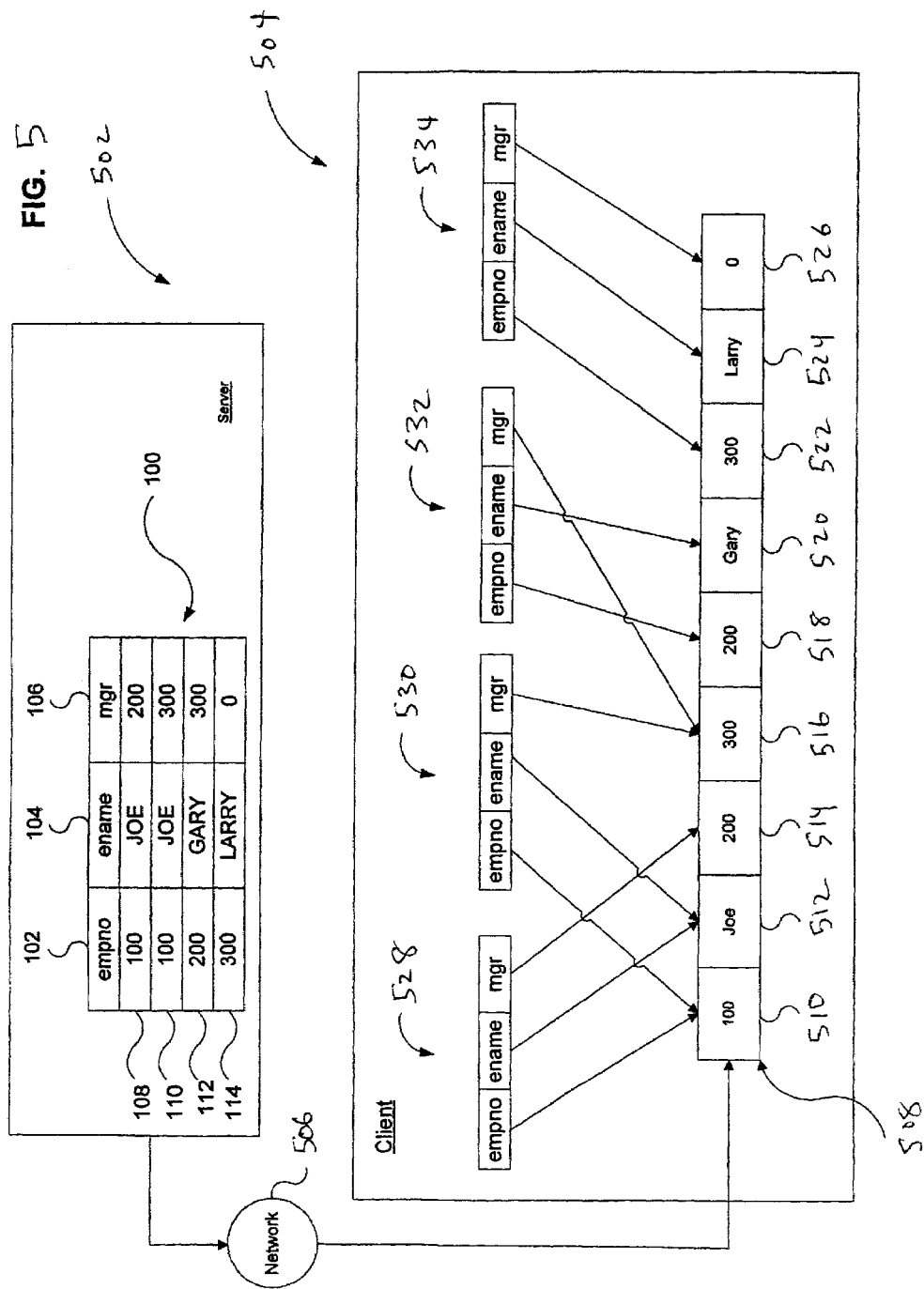
FIG. 5 illustrates data structures utilized in an embodiment of the invention.

FIG. 5 illustrates data structures at a client 504 that can be used to store and track the data that is sent from a server 502 to the client 504. For the convenience of the reader, database table 100 is reprinted and shown as the database table being sent from server 502 to client 504. Cache 508 represents the memory cache at client 504 that stores data sent from server 502.

In operation, a portion of table 100 from server 502 is explicitly requested for delivery to client 504. If prefetching is used, then a greater portion, or even all, of table 100 is sent in response to the user/client request. For purposes of this example, it is assumed that the entirety of table 100 is prefetched to client 504. Initially, all of row 108 would be sent from server 502 to client 504 over network 506. Thus, the values "100", "Joe", and "200" corresponding to columns 102, 104, and 106 of row 108 would be sent to client 504, and stored in cache sections 510, 512, and 514, respectively.

At client 504, data structures are maintained to allow a user to access the data that is received. In an embodiment, the data structures correspond to the types of data that are transmitted from server to client. Thus, data structure 528, corresponding to row 108 of table 100, contains pointers to each of the column values for row 108 in table 100. In particular, the pointers in data structure 528 point to cache sections 510, 512, and 514 of cache 508, which correspond to the local copy of row 108, and these pointers are used by a usr at client 504 to access these cached values.

Additional data structures are employed to track each row of data that is transmitted form server 502 to client 504. Thus, data structure 530 contains pointers to the cache sections containing values for row 110 of table 100. Similarly, data structures 532 and 534 contain pointers to the cache sections containing values for rows 112 and 114, respectively, of table 100 sent from server 502 to client 504.

After the first row 108 of table 100 is sent from server 502 to client 504, any transmission of additional rows results in the possibility that redundant data for column values will be requested for transmission across network 506. Thus bitmaps 400, 408, and 416 are consulted in an embodiment of the invention to determine whether a next-row redundant data value is being sent. If a next-row redundant data value situation occurs, then the redundant data value is not sent across network 506. Instead, the corresponding data structure at client 504 is configured to point to the previous copy that has already been transmitted.

Consider the values of row 110 in table 100. A review of rows 108 and 110 in column 102 of table 100 shows that there is no change in the column value. A similar review of these rows in column 104 shows that there is again no change in value. However, inspection of rows 108 and 110 in column 106 shows that the column value changes from "200" to "300". In this circumstance, only the changed column value (i.e., "300" in row 110, column 106 of table 100) is sent from server 502 to client 504. This changed column value is stored in cache section 516 of cache 508.

The data structure 530 for row 110 is configured to point to cache section 516 for its representation of column 106. However, for the unchanged column values that did not get transmitted from server 502 to client 504, data structure 530 is configured to point to existing cache sections that contain the redundant data. Thus, the pointer in data structure 530 corresponding to column 102 points to cache section 510 (which is also pointed to by the data structure pointer 528 corresponding to column 102 for row 108 of table 100). The pointer in data structure 530 corresponding to column 104 points to cache section 514 (which is also pointed to by the data structure pointer 528 corresponding to column 104 for row 108).

In an equivalent manner, it can be seen that only the values for columns 102 and 104 in row 112 differ from it preceding row 110. The column value for row 112 did not change in the transition from row 110 to 112. Thus, only the values for columns 102 and 104 in row 112 are transmitted from server 502 to client 504. These transmitted values are stored in cache sections 518 and 520. In the data structure 532 for row 112, it can be seen that pointers for columns 102 and 104 point to these newly filled cache sections, but the pointer for column 106 points to a cache section 516 previously filled for row 110.

For row 114, it can be seen that every column has a value that differs from its value in the preceding row. Thus, every column value is transmitted from server 502 to client 504, which is then stored in cache 508. Thus, cache section 522, 524, and 526 are used to store the values of row 144 transmitted to client 504. Data structure 534, which corresponds to row 114 in table 100, contains pointers that point to each of these newly filled cache sections.

While the embodiment just discussed only performs a data redundancy check for one preceding row, the invention can be extended to check or data redundancy across multiple previous rows. The data structures maintained form each row can point to any cache section in cache 508, even for cache sections filled by row values beyond just the immediately preceding row.

To track changes across multiple rows, a multidimensional bitmap can be maintained to track changes across multiple rows. Thus, the bitmap would contain multiple bits for each column-row pair, corresponding to an indication of value change for several preceding rows for that same column.

Instead of, or in addition to the use of a multidimensional bitmap, an additional optimization comprises a scan of cache 508 to eliminate redundant data storage, without the use of bitmaps to reduce the transmission of data redundancies. In this optimization, the redundant data in cache 508 are removed after they have been transmitted from server 502 to client 504 (which reduces cache usage at the client), and pointers in the data structures are reorganized to all point to the reduced and consolidated number of column values.

Further details regarding approaches for implementing prefetching with data redundancy reduction are disclosed in co-pending application Ser. No. 09/515,674, filed Feb. 29, 2000, entitled "METHOD AND MECHANISM FOR REDUCING CLIENT-SIDE MEMORY FOOTPRINT OF TRANSMITTED DATA", and application Ser. No. 10/144,666, filed May 10, 2002, entitled "METHOD AND MECHANISM FOR REDUCING CLIENT-SIDE MEMORY FOOTPRINT OF DATA FOR SCROLLABLE CURSORS", both of which are incorporated herein by reference in their entirety.

Pipelined prefetching may be advantageously used with respect to database cursors. A cursor is a handle to a query execution area, e.g., an area in memory in which a parsed structured query language ("SQL") statement and other information for processing the SQL statement is stored. In many database systems, a cursor is an available resource for accessing or parsing SQL statements embedded within an application. Cursors enable a SQL statement to retrieve rows from a database table into a given result set, which can then be accesses, displayed, or operated upon. Typically, a defined sequence of actions is performed to execute a SQL query statement. To execute a SQL query statement, the cursor is first created, either in conjunction with the SQL query or independently. The cursor may be automatically handled by the database system, or manually controlled by a programmer through an application programming interface. The SQL statement is thereafter parsed, optimized, and executed to produce a set of rows called the result set. The rows in the result set are retrieved ("fetched") either a row at a time or in groups. The cursor can be considered the database query and its result set. A final stage for processing the SQL query statement is to close the cursor.

A cursor can often be utilized like a pointer to a specific row in a result set. When the cursor is active, operations can be performed against the specific row or group of rows at which the cursor is pointing. Scrollable cursors can be employed that allow scrolling in both the forward and reverse directions. Scrolling a cursor allows results to be fetched out-of-order. A backwards scrollable cursor allows movement of the cursor in either the forward and backward directions, thereby permitting rows to be accessed in any order.

Consider if the user views the result set in a scrollable window at client display device, in which scrolling the display window causes a corresponding movement for the cursor position. This type of situation exists, for example, in systems configured to conserve network bandwidth by allowing request and transmission of only enough information to be sent that can fit onto a client's display device, page, window, or screen at a particular instance in time. In these systems, additional portions of the requested data are retrieved only if specifically requested, e.g., based upon the user scrolling or paging through the data displayed in the display window. When the user at the client accesses the result set, the current position of the cursor points at a row or set of rows in the result set. In practice, this may result from the user viewing that particular row or set of rows on the scrollable display window. There may be additional rows of data in the result set both before and after the current cursor position. The cursor is scrolled in the backward direction to view rows in the result set from before the current position. The cursor is scrolled in the forward direction to view rows in the result set after the current position. It is noted that scrolling a display window is only one of many possible ways to scroll a cursor; another possible approach to make explicit API calls to a database to reposition the cursor.

Pipelined prefetching can be employed to prefetch data in response to fetch commands responsive to scrolling a cursor. To illustrate this aspect of the invention according to an embodiment, consider if a scrollable cursor is implemented using multiple levels of caching to store a result set from a SQL operation. Using multiple levels of caching to implement a scrollable cursor is described in more detail in U.S. Pat. No. 6,973,457, entitled "Method and System for Scrollable Cursors", which is hereby incorporated by reference in its entirety.

Figure 6:
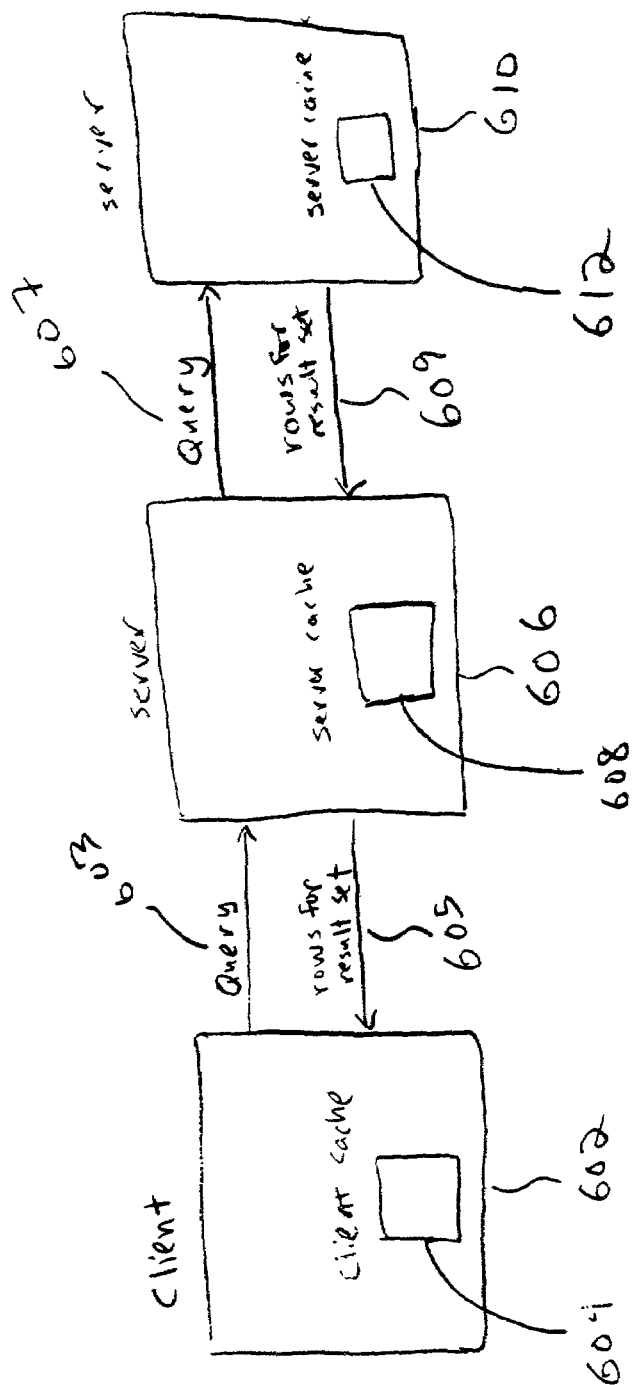
FIG. 6 depicts pipelined prefetching with scrollable cursors according to an embodiment of the invention.

FIG. 6 shows an architecture for implementing remote mapped queries with scrollable cursors according to one embodiment of the invention. As used herein, a remote mapped query refers to a query in which data that is accessed to respond to the query may exist at a remote location. Shown in FIG. 6 is a client device 602, a first server 606, and a second server 610. A client cache 604 may exist to locally cache rows for a result set 605 that is returned to the client 602 from first server 606. The first server 606 and second server 610 may each maintain its own cache 608 and 612, respectively, to locally cache data.

Consider the following query, which may cause first server 606 issues its own query 607 to second server 610 in response to receiving query 603 from client 602:

SELECT *
FROM table_at_server_606 A
WHERE EXISTS (SELECT * from table_at_server_610 B
WHERE A.value = B.value);

In an embodiment of the invention, this type of query can be satisfied by either moving the cursor to where the data is located or by moving the data to where the cursor is located. Various efficiency measures may be considered in determining whether the data or the query should be sent to a remote location, e.g., network efficiency or cache usage measures.

In the embodiment of the invention shown in FIG. 6, first server 606 requires access to data from second server 610 to process query 603. If the query is to be processed at second server 610 (i.e., a corresponding query 607 is sent from first server 606 to second server 610), then first server 606 essentially becomes a client to second server 610. It is noted that second server 610 may itself seek to remotely map a query to another server to process the query, which remotely maps the query to another server, etc., in an indefinite chain of remotely mapped queries. When processing remote query 607, rows of result set 609 are sent from second server 610 to first server 606. The rows in result set 609 are ultimately sent to client 602 as part of result set 605, with additional sorting, ordering, or processing possibly being performed at first server 606 depending upon the exact requirements of query 603. Therefore, it is very possible that the fetch commands issued to retrieve rows in result set 605 will cause corresponding fetch commands sent to second server 610 to retrieve rows in result set 609. These fetch commands may occur as a result of manipulating a scrollable cursor at client 602.

Scrollable cursors can be implemented with multiple levels of caching, in which a partial result set is stored at the client and a full or partial result set is stored at the server. In the example of FIG. 6, since first server 606 may become a client to second server 610, a similar multi-level caching arrangement may be implemented between these two servers. In particular, cache 608 at first server 606 is configured to store a portion of result set 609, while cache 612 at second server 610 is configured to store part or all of the result set 609.

If the cursor position is scrolled/moved at client 602 beyond the boundaries of cache 604, then a fetch command may be issued to server 606. If the fetch command and/or cursor scroll command extends beyond the data stored in cache 608 at first server 606, then first server 606 could issue another fetch command to second server 610. Since server second 610 maintains its own cache 612 for result set 609, the requested data can be immediately sent from second server 610 to first server 606. If query 607 causes second server 610 to issue a query against yet another server, then the above procedure is repeated to this additional server. Potentially, an infinitely long chain of servers, queries, caches, and cursors could be linked together in this manner.

The description of pipelined prefetching illustrated with respect to FIGS. 2 and 3 can be employed to more efficiently perform data transfers with respect to the remotely mapped query of FIG. 6. In particular, a fetch command and/or cursor scroll command 607 from server 606 to server 610 may result in prefetched data that is returned to server 606. The fetch command/scroll command 607 from server 606 may in response to a fetch command/scroll command 603 from client 602 to server 606. This chain of pipelined prefetching may extend an indefinitely long chain of servers, depending upon the exact query, server architecture, and system conditions that are being addressed.

System Architecture Overview

Figure 7:
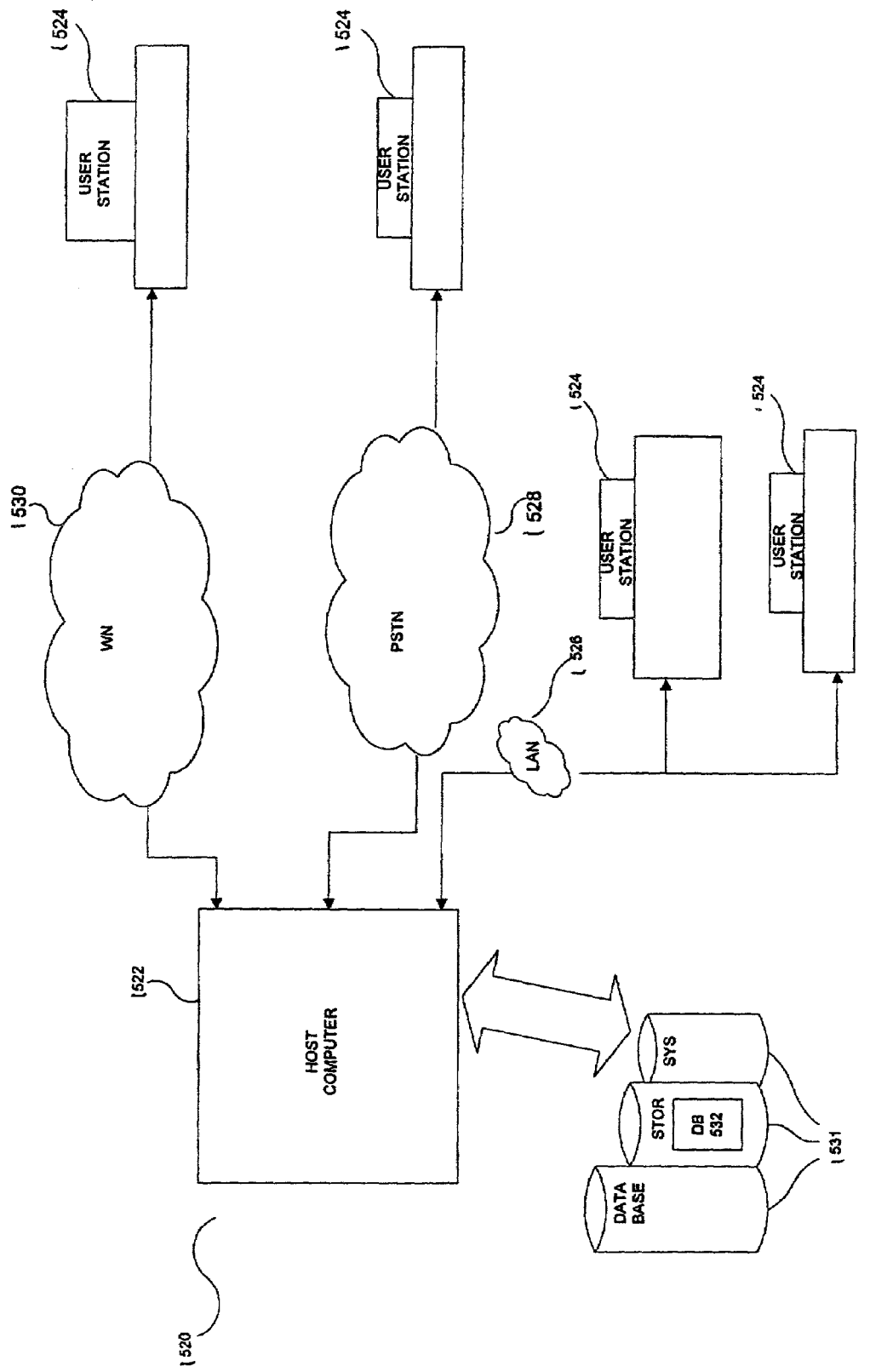
FIG. 7 is a diagram of a computer system with which the present invention can be implemented.

Referring to FIG. 7, in an embodiment, a computer system 1520 with which the invention may be practiced includes a host computer 1522 connected to a plurality of individual user stations 1524. In an embodiment, the user stations 1524 each comprise suitable data terminals, for example, but not limited to, e.g., computers, computer terminals or personal data assistants ("PDAs"), which can store and independently run one or more applications. For purposes of illustration, some of the user stations 1524 are connected to the host computer 1522 via a local area network ("LAN") 1526. Other user stations 1524 are remotely connected to the host computer 1522 via a public switched telephone network ("PSTN") 1528 and/or a wireless network 1530.

In an embodiment, the host computer 1522 operates in conjunction with a data storage system 1531, wherein the data storage system 1531 contains a database 1532 that is readily accessible by the host computer 1522. In alternative embodiments, the database 1532 may be resident on the host computer. In yet alternative embodiments, the database 1532 may be read by the host computer 1522 from any other medium from which a computer can read. In an alternative embodiment, the host computer 1522 can access two or more databases 1532, stored in a variety of mediums, as previously discussed.

Figure 8:
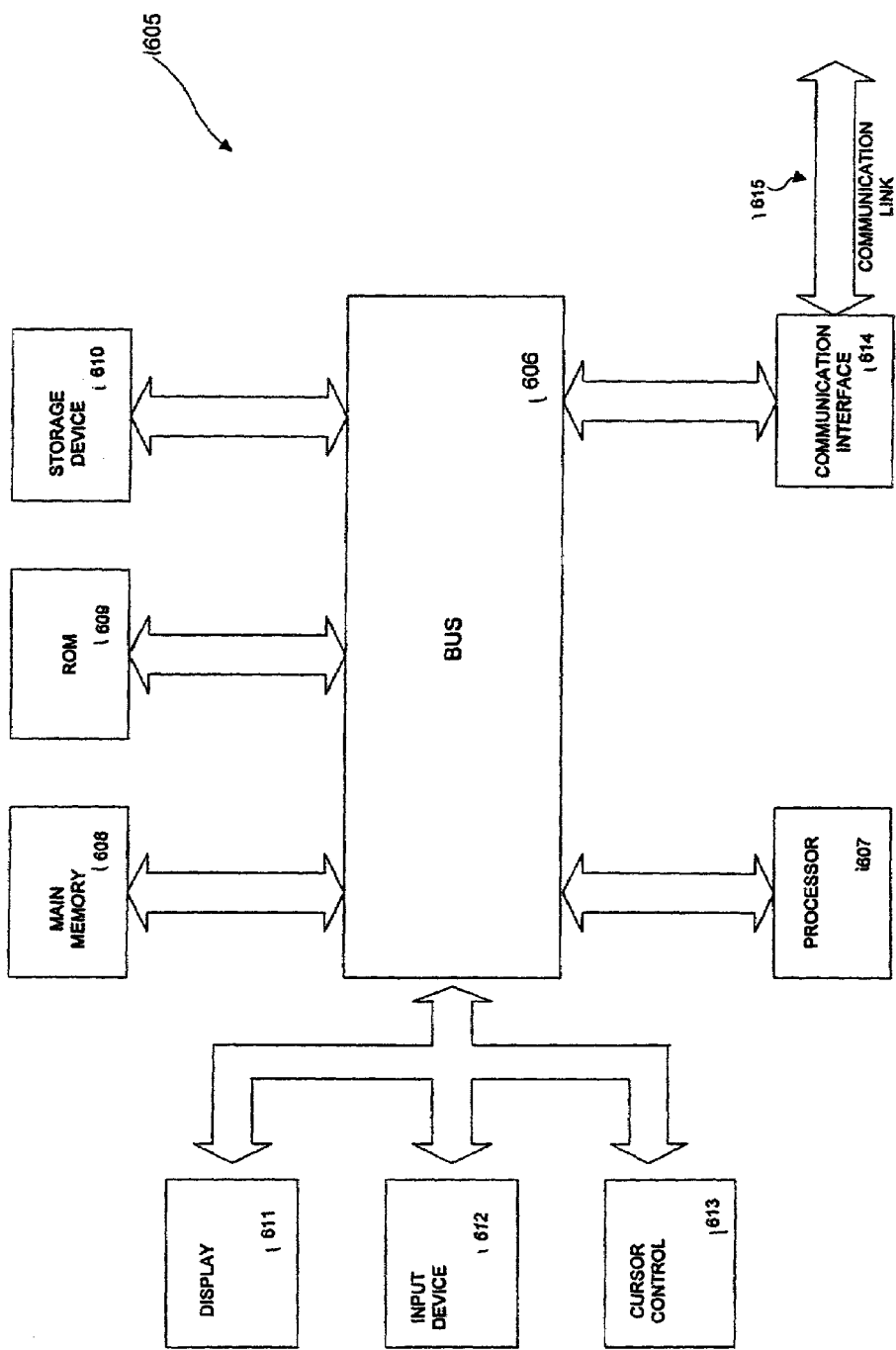
FIG. 8 is an additional diagram of a computer system with which the present invention can be implemented.

Referring to FIG. 8, in an embodiment, each user station 1524 and the host computer 1522, each referred to generally as a processing unit, embodies a general architecture 1605. A processing unit includes a bus 1606 or other communication mechanism for communicating instructions, messages and data, collectively, information, and one or more processors 1607 coupled with the bus 1606 for processing information. A processing unit also includes a main memory 1608, such as a random access memory (RAM) or other dynamic storage device, coupled to the bus 1606 for storing dynamic data and instructions to be executed by the processor(s) 1607. The main memory 1608 also may be used for storing temporary data, i.e., variables, or other intermediate information during execution of instructions by the processor(s) 1607.

A processing unit may further include a read only memory (ROM) 1609 or other static storage device coupled to the bus 1606 for storing static data and instructions for the processor(s) 1607. A storage device 1610, such as a magnetic disk or optical disk, may also be provided and coupled to the bus 1606 for storing data and instructions for the processor(s) 1607. A processing unit may be coupled via the bus 1606 to a display device 1611, such as, but not limited to, a cathode ray tube (CRT), for displaying information to a user. An input device 1612 is coupled to the bus 1606 for communicating information and command selections to the processor(s) 1607. A user input device may include a cursor control 1613 for communicating direction information and command selections to the processor(s) 1607 and for controlling cursor movement on the display 1611.

According to one embodiment of the invention, the individual processing units perform specific operations by their respective processor(s) 1607 executing one or more sequences of one or more instructions contained in the main memory 1608. Such instructions may be read into the main memory 1608 from another computer-usable medium, such as the ROM 1609 or the storage device 1610. Execution of the sequences of instructions contained in the main memory 1608 causes the processor(s) 1607 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1607. Such a medium may take many forms, including, but not limited to, non-volatile, volatile and transmission media. Non-volatile media, i.e., media that can retain information in the absence of power, includes the ROM 1609. Volatile media, i.e., media that can not retain information in the absence of power, includes the main memory 1608. Transmission media includes coaxial cables, copper wire and fiber optics, including the wires that comprise the bus 1606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications. Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 1607 can retrieve information.

Various forms of computer-usable media may be involved in providing one or more sequences of one or more instructions to the processor(s) 1607 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 1606 may receive the infrared signals and place the instructions therein on the bus 1606. The bus 1606 may carry the instructions to the main memory 1608, from which the processor(s) 1607 thereafter retrieves and executes the instructions. The instructions received by the main memory 1608 may optionally be stored on the storage device 1610, either before or after their execution by the processor(s) 1607.

Each processing unit may also include a communication interface 1614 coupled to the bus 1606. The communication interface 1614 provides two-way communication between the respective user stations 1524 and the host computer 1522. The communication interface 1614 of a respective processing unit transmits and receives electrical, electromagnetic or optical signals that include data streams representing various types of information, including instructions, messages and data. A communication link 1615 links a respective user station 1524 and a host computer 1522. The communication link 1615 may be a LAN 1526, in which case the communication interface 1614 may be a LAN card. Alternatively, the communication link 1615 may be a PSTN 1528, in which case the communication interface 1614 may be an integrated services digital network (ISDN) card or a modem. Also, as a further alternative, the communication link 1615 may be a wireless network 1530. A processing unit may transmit and receive messages, data, and instructions, including program, i.e., application, code, through its respective communication link 1615 and communication interface 1614. Received program code may be executed by the respective processor(s) 1607 as it is received, and/or stored in the storage device 1610, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A computer implemented method for prefetching data in a database system using multiple levels of prefetching to retrieve data between networked machines, comprising:

at a first prefetching level, receiving a client request for a data item to be sent from a first database server to a client, the first database server executing database query operations against data in a database to satisfy the client request;

determining by using a first processor, a first prefetch condition for the first prefetching level to satisfy the client request, wherein the first prefetch condition is used to control what data items to prefetch on the first prefetching level; and sending at least part of the data item from the first database server to the client;

prefetching, based at least upon the first prefetch condition, a second data item from the first database server to the client in anticipation of a future request from the client and storing, by using a bus, the second data item in a first data structure on a tangible computer readable medium or a storage device;

at a second prefetching level,
in response to the client request, receiving a first server request for a server data item to be sent from a second database server to the first database server, the first server request is to satisfy the client request;
receiving the server data item from the second database server to the first database server;
determining, by using a second processor, a second prefetch condition of the first prefetch condition for the second prefetching level to service the first server request, wherein the second prefetch condition is used to control what data items to prefetch on the second prefetching level;
determining existence of data redundancies when prefetching the second server data item by calculating row differences between successive rows in the second server data item by consulting a bitmap corresponding to changes between a first row and a second row of data; and
prefetching, based at least upon the second prefetch condition, a second server data item from the second database server to the first database server in anticipation of a future request from the first database.

2. The method of claim 1, further comprising:
transmitting a reduced set of the second server data item, said reduced set comprising a smaller memory footprint when compared to the second server data item.

3. The method of claim 2 in which determining the existence of the data redundancies is performed by identifying multiple copies of information; and the act of transmitting a reduced set of prefetch data comprises sending a single copy of the information that has not changed between a first row and a second row.

4. The method of claim 1 in which calculating the row differences between successive rows is performed by identifying identical column values for the successive rows.

5. The method of claim 1 in which determining the existence of the data redundancies is performed by creating a bitmap corresponding to changes between a first row and a second row of data, the bitmap containing bit values for differences in column values between the first and second rows.

6. The method of claim 1 in which the bitmap is a multi-dimensional bitmap.

7. The method of claim 1 in which a prefetch count is employed to identify quantity of data to prefetch.

8. The method of claim 7, wherein the prefetch count indicates a number of rows of a table to prefetch.

9. The method of claim 7, wherein the prefetch count is a tunable value, further comprising adjusting the prefetch count.

10. The method of claim 1 in which website data is prefetched.

11. The method of claim 1 in which prefetching is performed in response to a scrolling request for a scrollable cursor.

12. The method of claim 11 in which the scrolling request moves a position for the scrollable cursor corresponding to the data item.

13. The method of claim 12 in which the scrolling request is in the reverse direction.

14. The method of claim 1, further comprising at a third prefetching level;
issuing a third server request for a second server data item to be sent from a third database server to the second database server, the third database server performing additional database query operations to satisfy the second server request;
sending the requested third server data item from the third database server to the second database server; and
prefetching a fourth server data item from the third database server to the second database server in anticipation of a future request from the second database server, wherein the prefetched fourth server data item is not explicitly requested by the second database server.

15. The method of claim 1, wherein the prefetched second data item is not explicitly requested by the client request, and the prefetched second server data item is not explicitly requested by the first database server.

16. A system for prefetching data in a database system using multiple levels of prefetching to retrieve data between networked machines, comprising:
a client device comprising a client cache and a first data structure, wherein the client device issues a client request for a data item;
at a first prefetching level,
a first database server device comprising a server cache;
the first database server device determining, by using a first processor, a first prefetch condition for the first prefetching level to satisfy the client request, wherein the first prefetch condition is used to control what data items to prefetch on the first prefetching level;
the first database server performing database query operations to send the data item, to satisfy the client request and to prefetch, based at least upon the first prefetch condition, a second data item that is transmitted from the first database server to the client device and stored in the client cache; and
at a second prefetching level, a second server device configured for receiving a first server request for a requested server data item, wherein the first server request is to satisfy the client requests;
determining, by using a second processor, a second prefetch condition for the second prefetching level to service the first server request, wherein the second prefetch condition is determined independently of the first prefetch condition, and the second prefetch condition is used to control what data items to prefetch on the second prefetching levels;
determining existence of data redundancies when prefetching, the second server data item by calculating row differences between successive rows in the second, server data item by consulting a bitmap corresponding to changes between a first row and a second row of data; and
performing second server database query operations to send the requested server data item from the second database server to the first database sever and to prefetch, based at least in part upon the second prefetch condition, a second server data item that is transmitted from the second database server device to the first database server device and stored in the server cache.

17. The system of claim 16 in which the first and second database server devices determine the existence of data redundancies.

18. The system of claim 17 in which a reduced set of data is sent if the data redundancies are identified.

19. The system of claim 18 in which determining the existence of the data redundancies is performed by calculating row differences between successive rows of prefetched data.

20. The system of claim 18 in which determining the existence of the data redundancies is performed by consulting a bitmap corresponding to changes between's first row and a second row of data.

21. The system of claim 20 in which the bitmap is a multi dimensional bitmap.

22. The system of claim 16 in which a prefetch count is employed to identify quantity of data to prefetch.

23. The system of claim 22, wherein the prefetch count indicates a number of rows of a table to prefetch.

24. The system of claim 22, wherein the prefetch count is a tunable value.

25. The system of claim 16 in which website data is prefetched.

26. The system of claim 16 in which prefetching is performed in response to a scrolling request for a scrollable cursor.

27. The system of claim 26 in which the scrolling request moves a position for the scrollable cursor corresponding to the data item.

28. The system of claim 26 in which the scrolling request is in the reverse direction.

29. The system of claim 16, the second database server device comprising a second server cache, further comprising:
at a third prefetching level,
a third database server device, the third database server device performing database query operations to send a third requested server data item from the third database server to the second database sever and prefetch a fourth server data item that is transmitted from the third database server device to the second database server device and stored in the second server cache, wherein the prefetched fourth server data item is not explicitly requested by the second database server.

30. The system of claim 16, wherein the prefetched second data item is not explicitly requested by the client request, and the prefetched second server data item is not explicitly requested by the first database server.

31. A system for prefetching data in a database system using multiple is of prefetching to retrieve data between networked machines, comprising:
at a first prefetching level,
means for receiving a client request for a data item to be sent from a first database server to a client, the first database server executing database query operations against data in a database to satisfy the client request;
a first processor configured for determining a first prefetch condition for the first prefetching level to service the client request, wherein the means for determining the first prefetch condition comprises a first processor, and the first prefetch condition is used to control what data items to prefetch on the first prefetching level; and
means for sending part of the data item from the first database server to the client based at least in part upon the first prefetch condition;
means for prefetching, based at least in part on the first prefetch condition, a second data item from the first database server to the client-in anticipation of a future request from the client and a tangible computer readable medium or a storage device configured for storing at least part of the second data item in a first data structure;
at a second prefetching level,
means for, in response to the client request, receiving a first server request for a server data item to be sent from a second database server to the first database server, the first server request is to satisfy the client request;
means for receiving the server data item from the second database server 1 o the first database server;
a second processor configured for determining, by using a second processor, a second prefetch condition independently of the first prefetch condition for the second level to service the first server request, wherein the second prefetch condition is used to control what data items to prefetch on the second prefetching level;
means for determining existence of data redundancies when prefetching the second server data item by calculating row differences between successive rows in the second server data item by consulting a bitmap corresponding to changes between a first row and a second row of data; and
means for prefetching, based at least in part on the second prefetch condition, a second server data item from the second database server to the first database server-in anticipation of a future request from the first database server.

32. The system of claim 31, further comprising:
means for transmitting a reduced set of the second server data item, said reduced set comprising a smaller memory footprint when compared to the second server data item.

33. The system of claim 31 in which the means for determining the existence of the data redundancies comprises means for consulting a bit nap corresponding to changes between a first row and a second row of data.

34. The system of claim 31 in which the means for determining the existence of the data redundancies comprises means for identifying multiple copies of information; and the act of transmitting a reduced set of prefetch data comprises sending a single copy of the information that has not changed between a first row and a second row.

35. The system of claim 31 in which a prefetch count is employed to identify quantity of data to prefetch.

36. The system of claim 35, wherein the prefetch count indicates a number of rows of a table to prefetch.

37. The system of claim 35, wherein the prefetch count is a tunable value.

38. The system of claim 31 in which prefetching is performed in response to a scrolling request for a scrollable cursor.

39. The system of claim 31, further comprising at a third prefetching level,
means for issuing a second, server request for a third server data item to be sent from a third database server to the second database server, the third database server performing additional database query operations to satisfy the second server request;
means for sending the requested third server data item from the third database server to the second database server; and
means for prefetching a fourth server data item from the third database server to the second database server in anticipation of a future request from the second database server, wherein the prefetched fourth server data item is not explicitly requested by the second database server.

40. The system of claim 31, wherein the prefetched second data item is not explicitly requested by the client request, and the prefetched second server data item is not explicitly requested by the first database server.

41. A computer program product comprising a computer usable medium embedded executable code to execute a process for prefetching data in a database system using multiple levels of prefetching to retrieve data between networked machines, the process comprising:
at a first prefetching level, receiving a client request for a data item to he sent from a first database server to a client, the first database server executing database query operations against data in a database to satisfy the client request;

determining, by using a first processor, a first prefetch condition for the first prefetching level to satisfy the client request, wherein the first prefetch condition is used to control what data items to prefetch on the first prefetching level;

sending part of the data item from the first database server to the client;

prefetching, based at least in part on the first prefetch condition, a second data item from the first database server to the client in anticipation of a future request from the client and storing, by using a bus, the second data item in a first data structure on a tangible computer usable medium or a storage device;

at a second prefetching level, in response to the client request, receiving a first server request for a server data item to be sent from a second database server to the first database server, the first server request is to satisfy the client request;

receiving the server data item from the second database server to the first database server;

determining, by using a second processor, a second prefetch condition independently of the first prefetch condition for the second prefetching level to service the first server request, wherein the second prefetch condition is used to control what data items to prefetch on the second prefetching level;

determining existence of data redundancies when prefetching the second server data item by calculating row differences between successive rows in the second server data item by consulting a bitmap corresponding to changes between a first row and a second row of data; and prefetching, based at least on the second prefetch condition, a second server data item from the second database server to the first database server in anticipation of a future request from the first database server.

42. The computer program product of claim 41 further comprising:

transmitting a reduced set of the second server data item, said reduced set comprising a smaller memory footprint when compared to the second server data item.

43. The computer program product of claim 41 in which determining the existence of the data redundancies is performed by identifying multiple copies of information; and the act of transmitting a reduced set of prefetch data comprises sending a single copy of the information that has not changed between a first row and a second row.

44. The computer program product of claim 41 in which a prefetch count is employed to identify quantity of data to prefetch.

45. The computer program product of claim 44, wherein the prefetch count indicates a number of rows of a table to prefetch.

46. The computer program product of claim 44, wherein the prefetch count is a tunable value.

47. The computer program product of claim 41 in which prefetching is performed in response to a scrolling request for a scrollable cursor.

48. The computer program product of claim 41, wherein the executable code executes a process further comprising:

issuing a second server request for a third server data item to be sent from a third database server to the second database server, the third database server performing additional database query operations to satisfy the second server request; sending the third server data item from the third database server to the second database server; and prefetching a fourth server data item from the third database server to the second database server in anticipation of a future request from the second database server, wherein the prefetched fourth server data item is not explicitly requested by the second database server.

49. The computer program product of claim 41, wherein the prefetched second data item is not explicitly requested by the client request; and the prefetched second server data item is not explicitly requested by the first database server.

* * * * *

UNITED STATES PATENT AND TRADEMARK OFFICE
CERTIFICATE OF CORRECTION

PATENT NO.       : 7,610,351 B1                                              Page 1 of 1
APPLICATION NO.  : 10/144083
DATED            : October 27, 2009
INVENTOR(S)      : Sreenivas Gollapudi et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 1014 days.

On the title page, item (56), in column 2, under "Other Publications", line 3, delete "auroa." and insert -- aurora. --, therefor.

On page 2, in column 2, under "Other Publications", line 8, delete "PartherWorld" and insert -- PartnerWorld --, therefor.

On page 2, in column 2, under "Other Publications", line 30, delete ""Sqeezing" and insert -- "Squeezing --, therefor.

In column 6, line 61, delete "usr" and insert -- user --, therefor.

In column 14, line 48, in claim 16, delete "second," and insert -- second --, therefor.

In column 15, line 3, in claim 20, delete "between's" and insert -- between a --, therefor.

In column 15, line 50-52, in claim 31, after "wherein the" delete "means for determining the first prefetch condition comprises a first processor, and the".

In column 16, line 2, in claim 31, delete "1 o" and insert -- to --, therefor.

In column 16, line 3-4, in claim 31, after "determining" delete ", by using a second processor,".

In column 16, line 26, in claim 33, delete "bit nap" and insert -- bitmap --, therefor.

In column 17, line 1, in claim 41, delete "he" and insert -- be --, therefor.

Signed and Sealed this

Third Day of August, 2010

David J. Kappos
*Director of the United States Patent and Trademark Office*